United States Patent
Chao et al.

(10) Patent No.: US 9,590,269 B2
(45) Date of Patent: Mar. 7, 2017

(54) POLYELECTROLYTE AND ENERGY STORAGE DEVICE

(71) Applicants: Industrial Technology Research Institute, Hsinchu (TW); National Taiwan University, Taipei (TW)

(72) Inventors: Chung-Hsiang Chao, Hsinchu (TW); Li-Duan Tsai, Hsinchu (TW); Chia-Chen Fang, Taipei (TW); Chih-Ching Chang, Hsinchu (TW); Chi-Yang Chao, Taipei (TW); Kun-Lin Liu, Taipei (TW)

(73) Assignees: Industrial Technology Research Institute, Hsinchu (TW); National Taiwan University, Taipei (TW)

( * ) Notice: Subject to any disclaimer, the term of this patent is extended or adjusted under 35 U.S.C. 154(b) by 86 days.

(21) Appl. No.: 14/583,598

(22) Filed: Dec. 27, 2014

(65) Prior Publication Data

US 2015/0183897 A1    Jul. 2, 2015

(30) Foreign Application Priority Data

Dec. 31, 2013  (TW) .............................. 102149147 A
Dec. 24, 2014  (TW) .............................. 103145220 A

(51) Int. Cl.
*C08F 8/34*  (2006.01)
*H01G 11/64* (2013.01)
(Continued)

(52) U.S. Cl.
CPC ......... *H01M 10/0565* (2013.01); *C08C 19/04* (2013.01); *C08F 8/12* (2013.01);
(Continued)

(58) Field of Classification Search
CPC ................................. C08F 212/14; C08F 8/34
See application file for complete search history.

(56) References Cited

U.S. PATENT DOCUMENTS

| 4,471,037 A | 9/1984 | Bannister |
| 4,556,615 A | 12/1985 | Bannister |

(Continued)

FOREIGN PATENT DOCUMENTS

| CA | 1302488 | 6/1992 |
| CN | 1560129 | 1/2005 |

(Continued)

OTHER PUBLICATIONS

Lee et al Journal of Polymer Science Part A 2011 2325-2338.*

(Continued)

*Primary Examiner* — Mark Kaucher
(74) *Attorney, Agent, or Firm* — Jianq Chyun IP Office

(57) ABSTRACT

A polyelectrolyte includes a first segment and a second segment, wherein the structure of the first segment is at least one of formula (1) and formula (2); the structure of the second segment is at least one of formula (3) and formula (4). The polyelectrolyte undergoes microphase separation to form a nanoscale ordered self-assembled microstructure.

(1)              (2)

(Continued)

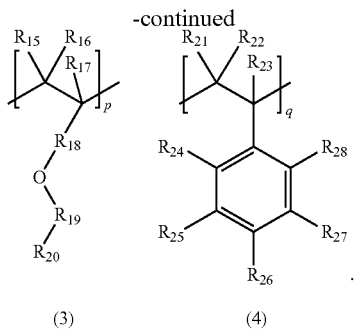

(3)    (4)

32 Claims, 11 Drawing Sheets

(51) Int. Cl.
| | | |
|---|---|---|
| H01M 10/0565 | (2010.01) | |
| H01G 9/028 | (2006.01) | |
| H01G 11/56 | (2013.01) | |
| C08F 12/22 | (2006.01) | |
| C08C 19/04 | (2006.01) | |
| C08F 212/08 | (2006.01) | |
| C08F 212/14 | (2006.01) | |
| H01M 10/052 | (2010.01) | |
| C08F 8/12 | (2006.01) | |
| C08F 8/44 | (2006.01) | |
| C08F 236/10 | (2006.01) | |
| H01M 8/10 | (2016.01) | |
| H01G 11/60 | (2013.01) | |
| H01G 11/62 | (2013.01) | |

(52) U.S. Cl.
CPC ............. C08F 8/44 (2013.01); C08F 12/22 (2013.01); C08F 212/08 (2013.01); C08F 212/14 (2013.01); C08F 236/10 (2013.01); H01G 9/028 (2013.01); H01G 11/56 (2013.01); H01M 10/052 (2013.01); H01G 11/60 (2013.01); H01G 11/62 (2013.01); H01G 11/64 (2013.01); H01M 2008/1095 (2013.01); H01M 2300/0082 (2013.01); Y02E 60/13 (2013.01)

(56) References Cited

U.S. PATENT DOCUMENTS

| | | | |
|---|---|---|---|
| 4,882,243 | A | 11/1989 | Skotheim et al. |
| 4,914,161 | A | 4/1990 | Muller et al. |
| 5,183,715 | A | 2/1993 | North |
| 5,332,631 | A | 7/1994 | Abraham et al. |
| H001546 | H | 6/1996 | Walker, Jr. |
| 5,604,660 | A | 2/1997 | Bai et al. |
| 5,656,386 | A | 8/1997 | Scherer et al. |
| 5,688,614 | A | 11/1997 | Li et al. |
| 5,989,742 | A | 11/1999 | Cabasso et al. |
| 6,096,453 | A | 8/2000 | Grunwald |
| 7,473,491 | B1 | 1/2009 | Amine et al. |
| 8,058,353 | B2 | 11/2011 | Willis et al. |
| 8,075,951 | B2 | 12/2011 | Hammond-Cunningham et al. |
| 2003/0180624 | A1 | 9/2003 | Oh et al. |
| 2004/0214090 | A1 | 10/2004 | West et al. |
| 2005/0019667 | A1 | 1/2005 | Oh et al. |
| 2005/0142431 | A1* | 6/2005 | Shimomura ........ H01M 4/8605 429/509 |
| 2007/0021569 | A1 | 1/2007 | Willis et al. |
| 2007/0105328 | A1* | 5/2007 | Saito ............... H01M 4/0404 438/309 |
| 2008/0254362 | A1* | 10/2008 | Raffaelle ............... B82Y 30/00 429/188 |
| 2009/0258275 | A1* | 10/2009 | Kumagai ............. C08J 5/2231 429/493 |
| 2010/0203783 | A1 | 8/2010 | Willis et al. |
| 2012/0129045 | A1 | 5/2012 | Gin et al. |

FOREIGN PATENT DOCUMENTS

| | | | |
|---|---|---|---|
| CN | 1938895 | 3/2007 | |
| CN | 101228192 | 7/2008 | |
| CN | 101794892 | 8/2010 | |
| CN | 102318125 | 1/2012 | |
| EP | 0301774 | 2/1989 | |
| JP | 2000319381 | 11/2000 | |
| JP | 2003123842 | 4/2003 | |
| JP | WO 2013031634 A1 * | 3/2013 | ............ C08F 297/04 |
| TW | 442520 | 6/2001 | |
| TW | I345331 | 7/2011 | |
| TW | I378942 | 12/2012 | |
| TW | 201315766 | 4/2013 | |
| WO | 9826463 | 6/1998 | |
| WO | 03083973 | 10/2003 | |
| WO | 2013062991 | 5/2013 | |

OTHER PUBLICATIONS

N. Byrne, et al., "Composition effects on ion transport in a polyelectrolyte gel with the addition of ion dissociators," Electrochimica Acta, vol. 50, No. 19, Jun. 2005, pp. 3917-3921.

D. Baril, et al., "Electrochemistry of liquids vs. solids: polymer electrolytes," Solid State Ionics, vol. 94, Feb. 1997, pp. 35-47.

J. F. Snyder, et al., "Ion Conductivity of Comb Polysiloxane Polyelectrolytes Containing Oligoether and Perfluoroether Sidechains," Journal of The Electrochemical Society, vol. 150, No. 8, Jul. 2003, pp. A1090-A1094.

J. Travas-Sejdic, et al., "Ion conductivity of novel polyelectrolyte gels for secondary lithium-ion polymer batteries," Electrochimica Acta, vol. 46, No. 10, Mar. 2001, pp. 1461-1466.

Daniel T. Welna, et al.,"Lithium-Ion Conductive Polymers as Prospective Membranes for Lithium-Seawater Batteries," Chem. Mater. vol. 18, No. 8, Aug. 2006, pp. 4486-4492.

Wolfgang H. Meyer, "Polymer Electrolytes for Lithium-Ion Batteries," Advanced Materials, vol. 10, No. 6, Apr. 1998, pp. 439-448.

Xiao-Guang Sun, et al., "Synthesis and Characterization of Network Single Ion Conductors Based on Comb-Branched Polyepoxide Ethers and Lithium Bis(allylmalonato)borate," Macromolecules, vol. 39, No. 1, Jan. 2006, pp. 362-372.

Guliz Cakmak, "Synthesis and characterization of solid single ion conductors based on poly[lithium tetrakis (ethyleneboryl)borate]," J. Mater. Chem., vol. 19, Jan. 2009, pp. 4310-4318.

Kui Xu, et al., "Synthesis and Characterization of Self-Assembled Sulfonated Poly(styrene-b-vinylidene fluoride-b-styrene) Triblock Copolymers for Proton Conductive Membranes," Chem. Mater., vol. 19, Oct. 2007, pp. 5937-5945.

Michael A. Hickner, et al., "Alternative Polymer Systems for Proton Exchange Membranes (PEMs)," Chemical Reviews, vol. 104, No. 10, Oct. 2004, pp. 4587-4612.

Y. Yang, et al., "Synthetic Strategies for Controlling the Morphology of Proton Conducting Polymer Membranes," Fuel Cells, Special Issue: Polymer Membranes I, vol. 5, No. 2, Apr. 2005, pp. 171-186.

Peixiang Xing, et al., "Synthesis and characterization of sulfonated poly(ether ether ketone) for proton exchange membranes," Journal of Membrane Science, vol. 229, No. 1-2, Feb. 2004, pp. 95-106.

A. Mokrini, et al., "New ion conducting systems based on star branched block copolymer," Polymer, vol. 42, No. 21, Oct. 2001, pp. 8817-8824.

M. Rikukawa, et al., "Proton-conducting polymer electrolyte membranes based on hydrocarbon polymers," Progress in Polymer Science, vol. 25, No. 10, Dec. 2000, pp. 1463-1502.

(56) References Cited

OTHER PUBLICATIONS

"Office Action of Taiwan Counterpart Application," issued on Aug. 13, 2015, p1-p5, in which the listed references were cited.
"Office Action of China Counterpart Application", issued on Jul. 25, 2016, p1-p8, in which the listed reference was cited.

* cited by examiner

POLYELECTROLYTE AND ENERGY STORAGE DEVICE

CROSS-REFERENCE TO RELATED APPLICATION

This application claims the priority benefit of Taiwan application serial no. 102149147, filed on Dec. 31, 2013 and Taiwan application serial no. 103145220, filed on Dec. 24, 2014. The entirety of each of the above-mentioned patent applications is hereby incorporated by reference herein and made a part of this specification.

TECHNICAL FIELD

The disclosure relates to a polyelectrolyte suitable for an energy storage device.

BACKGROUND

As the demand for high power and high energy density of a lithium secondary battery continues to rise, more and more research units are dedicated to increasing the safety and the stability of the lithium secondary battery. Moreover, since the dependence on portable electronic products is increased, and applications of an electrochemical energy storage apparatus in, for instance, automobiles and uninterruptible power supplies are expected to increase, the requirements for the safety of the lithium secondary battery need to be further improved, in particular when the lithium secondary battery is applied in, for instance, airplanes of high-altitude flight or space shuttles. Currently, research related to safety is often focused on the development of, for instance, a flame retardant additive, solid electrolyte, or a new electrolyte system, so as to alleviate various issues of the liquid electrolyte and increase the thermal stability of the electrochemical energy storage device. Moreover, it is desired to effectively reduce or completely omit an organic solvent having high volatility and flammability.

The polyelectrolyte in the solid electrolyte is also called a single-ion conductor (SIC), and an anion or a cation of the polyelectrolyte is covalently bonded on the repeating unit of a polymer. Since the anion or the cation is fixed on a polymer chain, the ion does not cause a concentration gradient. As a result, the possibility of a salt being deposited on an electrode or a separator is reduced, such that cycle life of the device is extended.

Although the polyelectrolyte can inhibit puncture by the deposit of lithium metal, thus increasing the safety of the lithium battery, and the polyelectrolyte can be arbitrarily prepared in terms of size and shape and is suitable for various lithium batteries, the worse ionic conductivity (solid polymer electrolyte is about $10^{-5}$ S/cm, single ion conductor is about $10^{-6}$ S/cm) thereof has always hindered its application and commercialization.

SUMMARY

A polyelectrolyte of the disclosure includes a first segment and a second segment, wherein the structure of the first segment is at least one of formula (1) and formula (2); and the structure of the second segment is at least one of formula (3) and formula (4).

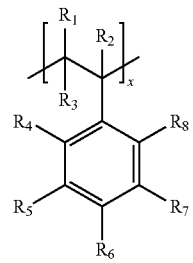
(1)

In formula (1), $R_1$ to $R_8$ are each independently H, F, or

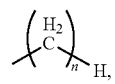

$n=1$ to 10, $x=1$ to 1000.

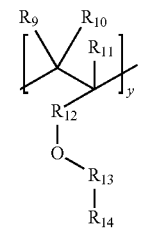
(2)

In formula (2), $R_9$ to $R_{11}$ are each independently H, F, or

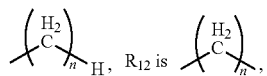

$R_{13}$ is

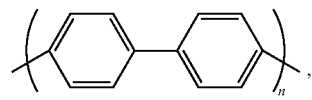

$R_{14}$ is H,

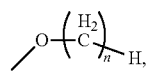

or —CN, $n=1$ to 10, $y=1$ to 1000.

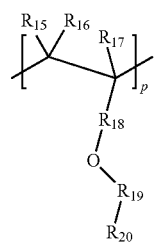
(3)

In formula (3), $R_{15}$ to $R_{17}$ are each independently H, F, or

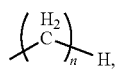

$R_{18}$ to $R_{19}$ are each independently

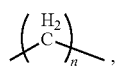

$R_{20}$ is $SO_3^-M^+$, $PO_4^-M^+$, or $COO^-M^+$, n=1 to 10, $M^+$ is $H^+$, $Li^+$, $Na^+$, or $K^+$, p=1 to 500.

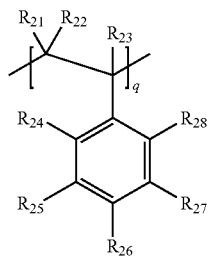

(4)

In formula (4), $R_{21}$ to $R_{23}$ are each independently H, F, or

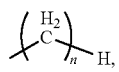

$R_{24}$ to $R_{28}$ are each independently H, F,

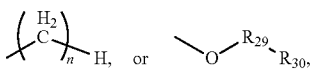

and at least one of $R_{24}$ to $R_{28}$ is

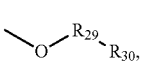

$R_{29}$ is

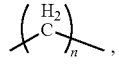

$R_{30}$ is $SO_3^-M^+$, $PO_4^-M^+$, or $COO^-M^+$, n=1 to 10, $M^+$ is $H^+$, $Li^+$, $Na^+$, or $K^+$, q=1 to 500.

Another polyelectrolyte of the invention includes a first segment, a second segment, and a third segment, and the third segment is between the first segment and the second segment. In particular, the structure of the first segment is at least one of above formula (1) and formula (2), the structure of the second segment is at least one of above formula (3) and formula (4), and the structure of the third segment is formula (5).

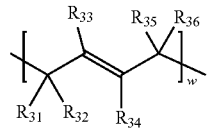

(5)

In formula (5), $R_{31}$ to $R_{36}$ are each independently H, F, or

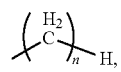

n=1 to 10, w=1 to 500.

In order to make the aforementioned features of the disclosure more comprehensible, embodiments accompanied with figures are described in detail below.

DETAILED DESCRIPTION OF DISCLOSED EMBODIMENTS

Figure 1:
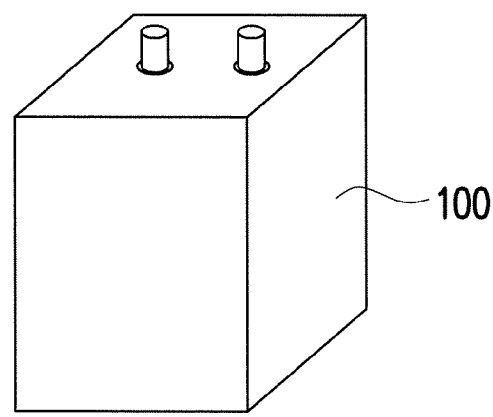
FIG. 1 is a schematic of an energy storage device according to an embodiment of the invention.

A polyelectrolyte of the disclosure includes a first segment and a second segment, wherein the structure of the first segment is at least one of formula (1) and formula (2); and the structure of the second segment is at least one of formula (3) and formula (4). The molecular weight ($M_w$) of the first segment is, for instance, between 10,000 and 90,000; the molecular weight of the second segment is, for instance, between 10,000 and 30,000.

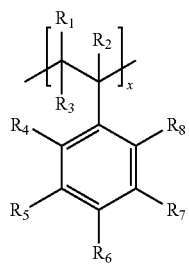
(1)

In formula (1), $R_1$ to $R_8$ are each independently H, F, or

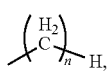

$n=1$ to 10, $x=1$ to 1000. Moreover, the molecular repeating unit x of the first segment is preferably 300 to 900.

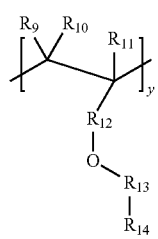
(2)

In formula (2), $R_9$ to $R_{11}$ are each independently H, F, or

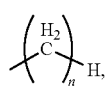

$R_{12}$ is

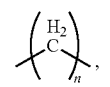

$R_{13}$ is

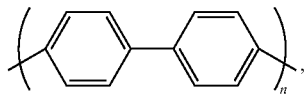

$R_{14}$ is H,

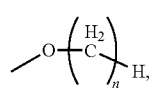

or —CN, $n=1$ to 10, $y=1$ to 1000. Moreover, the molecular repeating unit y of the first segment is preferably 300 to 900.

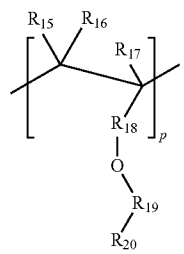
(3)

In formula (3), $R_{15}$ to $R_{17}$ are each independently H, F, or

$R_{18}$ to $R_{19}$ are each independently

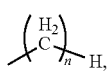, $R_{20}$ is $SO_3^-M^+$, $PO_4^-M^+$, or $COO^-M^{30}$, $n=1$ to 10, $M^+$ is $H^+$, $Li_+$, $Na^+$, or $K^+$, $p=1$ to 500. The molecular repeating unit p of the second segment is preferably 50 to 200.

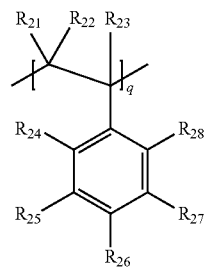
(4)

In formula (4), $R_{21}$ to $R_{23}$ are each independently H, F, or

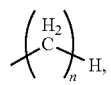

$R_{24}$ to $R_{28}$ are each independently H, F,

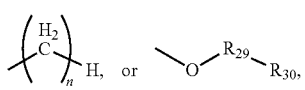

and at least one of $R_{24}$ to $R_{28}$ is

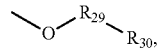

$R_{29}$ is

$R_{30}$ is $SO_3^-M^+$, $PO_4^-M^+$, or $COO^-M^+$, n=1 to 10, $M^+$ is $H^+$, $Li^+$, $Na^+$, or $K^+$, q=1 to 500. The molecular repeating unit q of the second segment is preferably 50 to 200.

In the present embodiment, the first segment is responsible for providing mechanical strength and water- and oxygen-blocking properties to the polyelectrolyte, and the structure of formula (1) or the structure of formula (2) can be selected, or the first segment can have the structures of both formula (1) and formula (2); the second segment is responsible for providing ionic conductivity to the polyelectrolyte, and the structure of formula (3) or the structure of formula (4) can be selected, or the second segment can have the structures of both formula (3) and formula (4). Accordingly, the polyelectrolyte undergoes microphase separation to form a nanoscale ordered self-assembled microstructure.

Another polyelectrolyte of the disclosure includes a third segment between the first segment and the second segment, and the structure of the third segment is formula (5). In the present embodiment, the molecular weight of the third segment is, for instance, between 10000 and 20000.

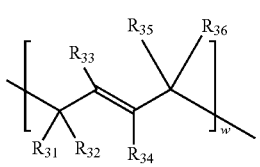

(5)

In formula (5), $R_{31}$ to $R_{36}$ are each independently H, F, or

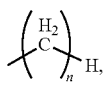

n=1 to 10, w=1 to 500. The molecular repeating unit w of the third segment is preferably 100 to 400.

In the present embodiment, the third segment is between the first segment and the second segment, and the function thereof is to keep the second segment far away from the first segment, such that the second segment is not limited by the first segment. As a result, a greater free swinging space can be obtained, and the ionic conductivity of the polyelectrolyte is thereby increased.

All polyelectrolyte of the disclosure can undergo microphase separation, and thus a nanoscale ordered self-assembled structure can be formed. Moreover, the main structure formed by the first segment within the polyelectrolyte provides mechanical strength and the function of preventing penetration of water and oxygen to the polymer; the ion-conducting channel is responsible for the transfer of ions. The second segment within the polyelectrolyte comprises moiety having a functional group such as sulfonate, phosphate, or carboxylate and covalently bonded on the main chain, and does not move. As a result, ion transference number can be significantly increased. Moreover, since the ions can only move in the nano channel, the formed metal deposit is also limited therein, such that the possibility of puncture by a metal dendrite is reduced.

Moreover, in the polyelectrolyte of the disclosure, it is observed that the addition of a plasticizer, a high-dielectric constant solvent, or a liquid electrolyte of a different proportion also facilitates the increase in ionic conductivity. For instance, the plasticizer may be, for instance, bis(2-ethylhexyl)phthalate (BEHP), dibutyl phthalate (DBP), diisobutyl phthalate (DIBP), etc. The high-dielectric constant solvent may be, for instance, propylene carbonate (PC), ethylene carbonate (EC), diethyl carbonate (DEC), dimethyl carbonate (DEC), ethyl methyl carbonate (EMC), etc. The liquid electrolyte may be formed by dissolving an electrolyte (i.e., lithium salt) such as $LiPF_6$, $LiBF_4$, $LiClO_4$, LiTFSI and so on in the high-dielectric constant solvent.

Therefore, for the polyelectrolyte of the disclosure, the ionic conductivity is always greater than $10^{-5}$ S/cm at room temperature and without any solvent or electrolyte solution. In the case of adsorption by a small amount of electrolyte solution (<30 wt %), an ionic conductivity of $10^{-4}$ S/cm is obtained.

FIG. 1 is a schematic of an energy storage device according to an embodiment of the invention.

An energy storage device 100 in FIG. 1 is only a schematic, and can be, for instance, a lithium ion primary battery, a lithium ion secondary battery, a capacitor, a supercapacitor, a fuel cell, a metal-sulfur battery, or a metal-air battery. The polyelectrolyte of the disclosure can be applied within the energy storage device 100 via a method such as mixing, coating, covering, or adding.

Several examples are described below to verify the efficacy of the disclosure. However, the disclosure is not limited to the following content.

EXAMPLE 1

According to the following synthesis process, 100 μl of sec-butyllithium (1.3M in cyclohexane) and 12.88 ml of styrene monomer are added into THF solvent at −78° C., and then the mixture is stirred for 15 minutes. At the same temperature, 4.17 ml of p-tert-butoxystyrene is added. After 3 days, anhydrous methanol is used to stop the reaction. In the meantime, a copolymer of polystyrene and PtBuOS (poly(p-tert-butoxystyrene)) is precipitated.

12 g of foregoing copolymer is solved in 1,4-dioxane, and 7.1 ml of 37 wt % hydrochloric acid is added. The mixture is heated to 60° C. and stands for 2 days, and then the polymer is precipitated in n-hexane followed by water rinse again and again, so as to obtain a de-protection copolymer of poly(p-hydroxystyrene).

10 g of the de-protection copolymer is dissolved in THF. After heating to 60° C., 3.6 g of KH is added in the mixture to react for 2 hours. Next, 5.3 g of 1,3-propanesultone is added in the mixture. After 24 hours, the product is cleaned by methanol, and excess TBAOH (tetrabutylammonium hydroxide) and 1.5M sulfuric acid solution are added respectively. After cleaning by 1M LiOH, the resulting polyelectrolyte is obtained.

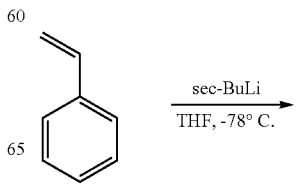

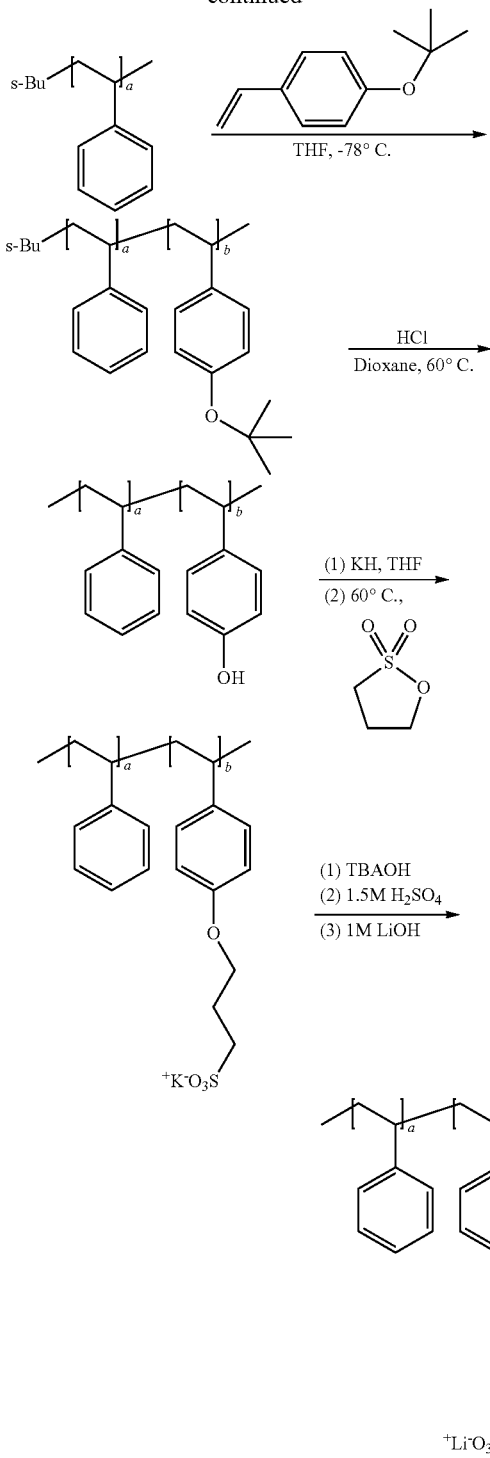

of the dry film could not be measured, measurement of lithium ionic conductivity was further performed on a wet film formed by soaking the dry film in an electrolyte (1M LiClO$_4$ in EC/PC), and the results are shown in Table 1 below.

TABLE 1

| DBP content (wt %) | Dry film | | Wet film | |
|---|---|---|---|---|
| | Thickness (μm) | σ (×10$^{-5}$ S/cm) | σ (×10$^{-5}$ S/cm) | Impregnation ratio (wt %) |
| 10 | 185 | N/A | 1.2 | 10.8 |
| 20 | 198 | N/A | 2.4 | 26.4 |
| 30 | 215 | N/A | 3.7 | 27.2 |
| 40 | 222 | N/A | 4.1 | 30.8 |

Figure 3:
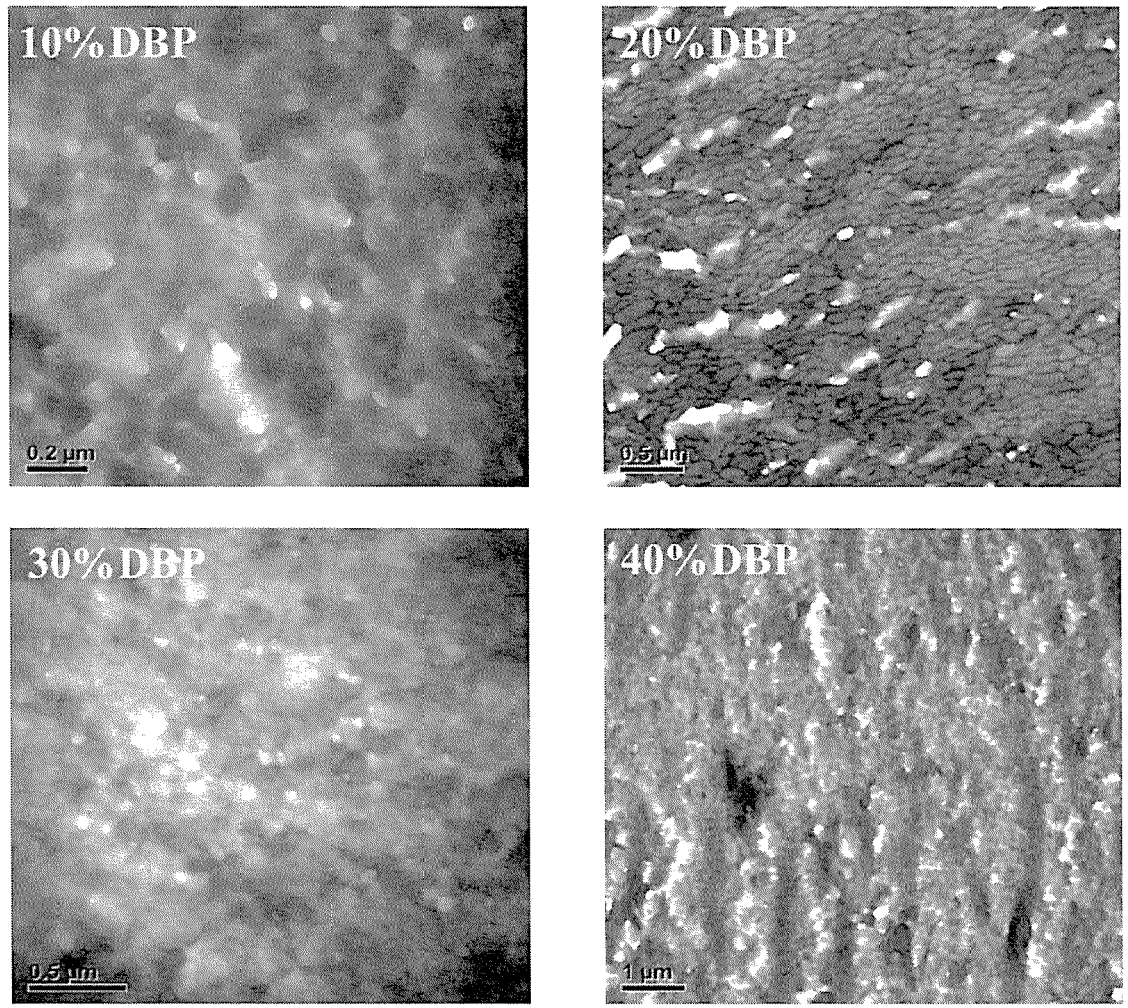
FIG. 3 is a cross-sectional TEM image of the polyelectrolyte with plasticizer in example 1.

It can be known from Table 1 that, the ionic conductivity of the wet film is 1.2×10$^{-5}$ to 4.1×10$^{-5}$ S/cm, and the impregnation ratio thereof is 10.8 wt % to 30.8 wt %. FIG. 3 shows a cross-sectional TEM image of the polyelectrolyte with plasticizer, and it can be observed that the polyelectrolyte of example 1 undergoes microphase separation to form a spherical structure.

EXAMPLE 2

According to the following synthesis process, 70 μl of sec-butyllithium (1.3M in cyclohexane) and 5 ml of styrene monomer are added into THF solvent at −78° C., and then the mixture is stirred for 15 minutes. At the same temperature, 2.67 ml of isoprene monomer is added. The temperature is then risen to −30° C. After 3 days, anhydrous methanol is used to stop the reaction. In the meantime, a copolymer of polystyrene and poly(1, 2 or 3,4-isoprene) is precipitated.

1.5 g of foregoing copolymer is solved in THF, and 40 ml of 9-borabicyclo(3.3.1)nonane (9-BBN) [0.5M in THF] is added at −15° C. The mixture is heated to 55° C. and stands for 2 days, and then the temperature is cooled down to −25° C. 1 ml of methanol is added to the mixture and then stirred for 30 minutes. 0.46 g of 6N NaOH and 4 ml of 30% H$_2$O$_2$ aqueous solution are added in the mixture. After 2 hours, the temperature is risen to 55° C. for 1 hour. After phase separation, the upper level solution is added in to 0.25M NaOH aqueous solution and then precipitated to obtain a copolymer in which the double bonds of isoprene are hydrolyzed into hydroxyl groups.

0.5 g of the hydrolyzed copolymer is dissolved in THF. After heating to 60° C., 0.6 g of KH is added the mixture to react for 2 hours. Next, 0.37 ml of 1,3-propanesultone is added in the mixture. After 8 hours, the product is cleaned by methanol, and excess TBAOH (tetrabutylammonium hydroxide) and 1.5M sulfuric acid solution are added respectively. After cleaning by 1M LiOH, the resulting polyelectrolyte is obtained (R is CH$_3$ or H).

Figure 2:
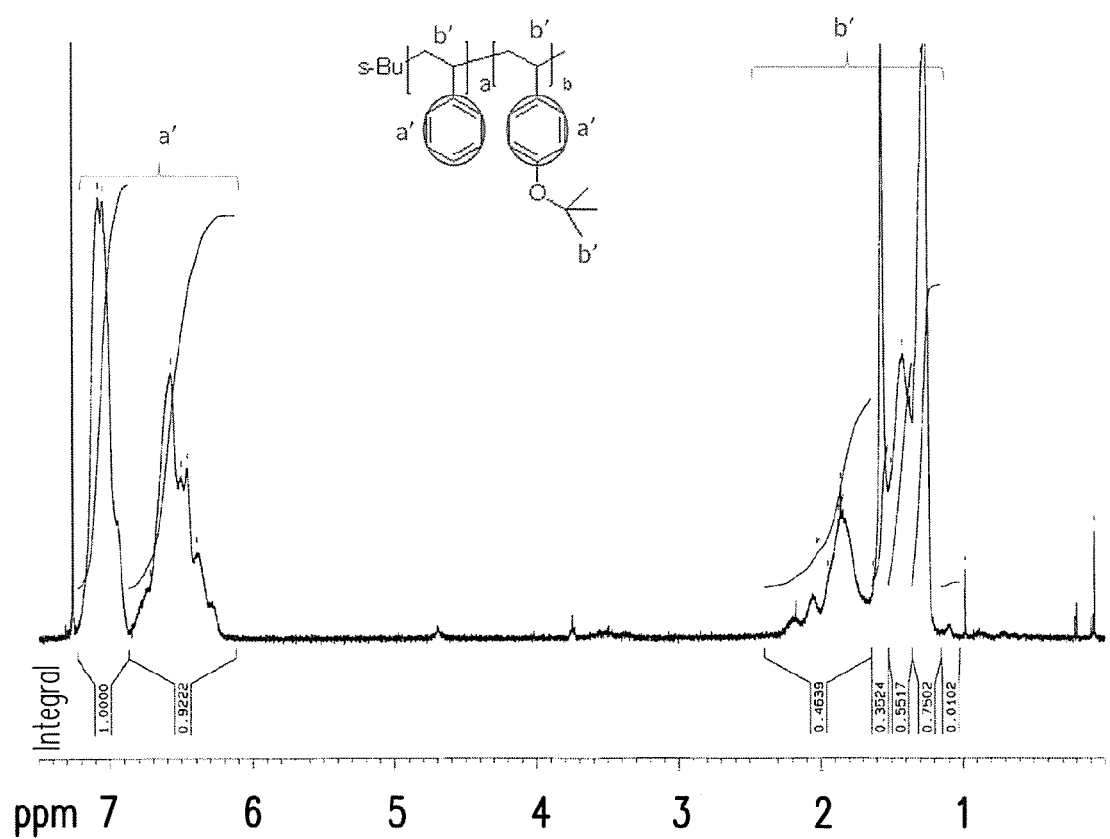
FIG. 2 shows 1H-NMR spectrum of example 1.

Then, the PS standard product was compared by using gel permeation chromatography (GPC), and it was observed that the molecular weights of the two segments were respectively Mw 90,000 and 30,000 (wherein a and b are estimated to be about 865 and 717 respectively), and a nuclear magnetic resonance apparatus (1H-NMR) also confirmed the proportion of the two segments as shown in FIG. 2. Then, a plasticizer n a different amount was added: dibutyl phthalate (DBP), so as to facilitate forming of film. Measurement was performed on the dry film; however, since ionic conductivity

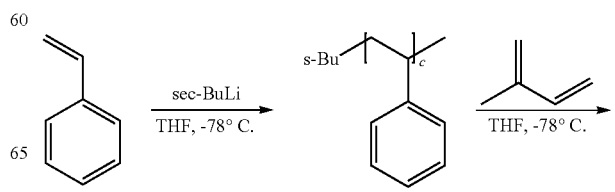

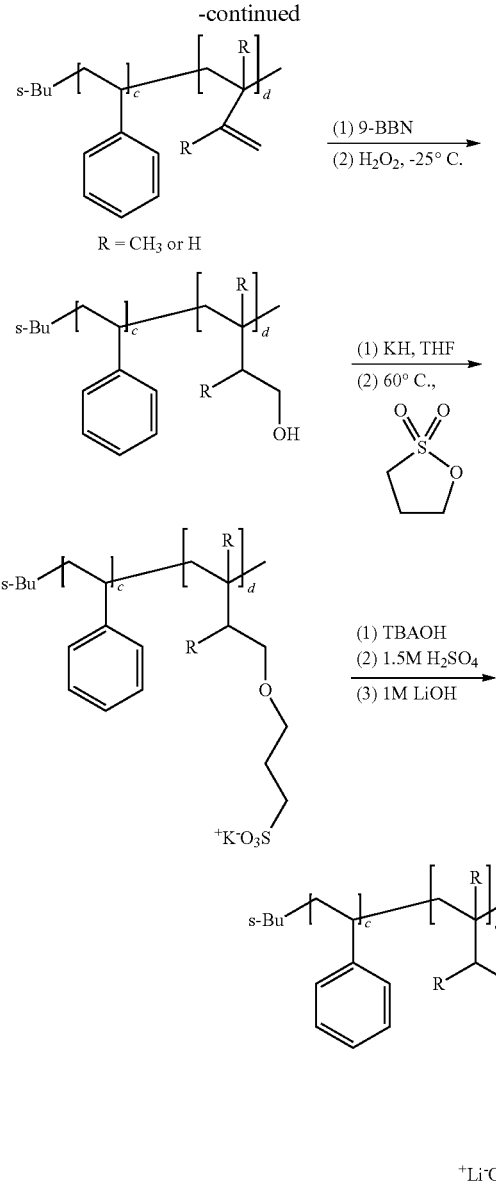

Figure 4:
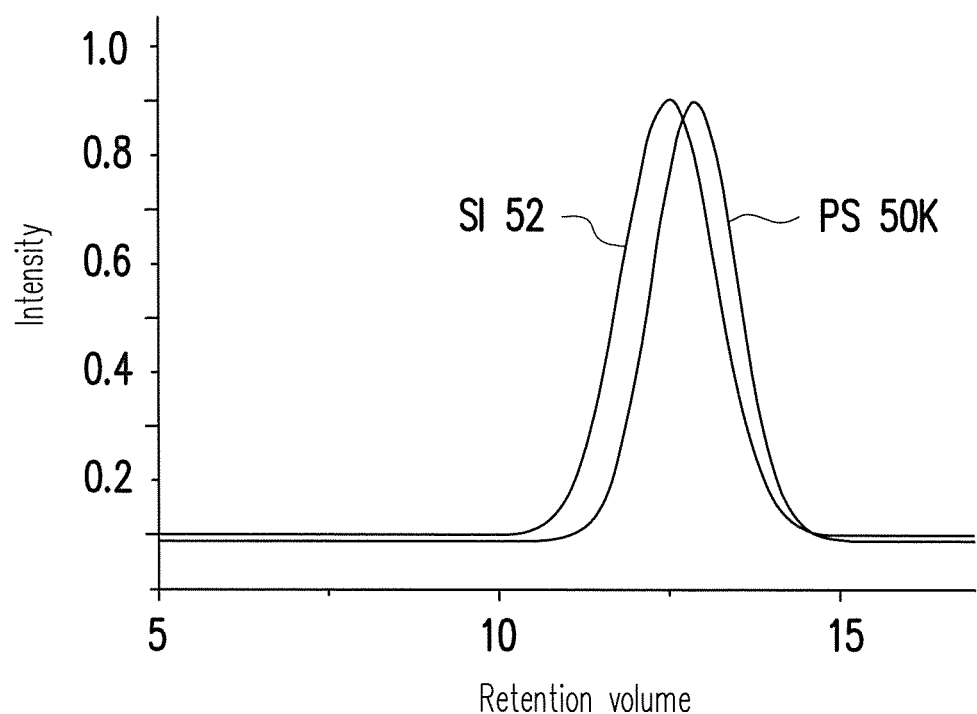
FIG. 4 is a GPC chromatograph of example 2.
Figure 5:
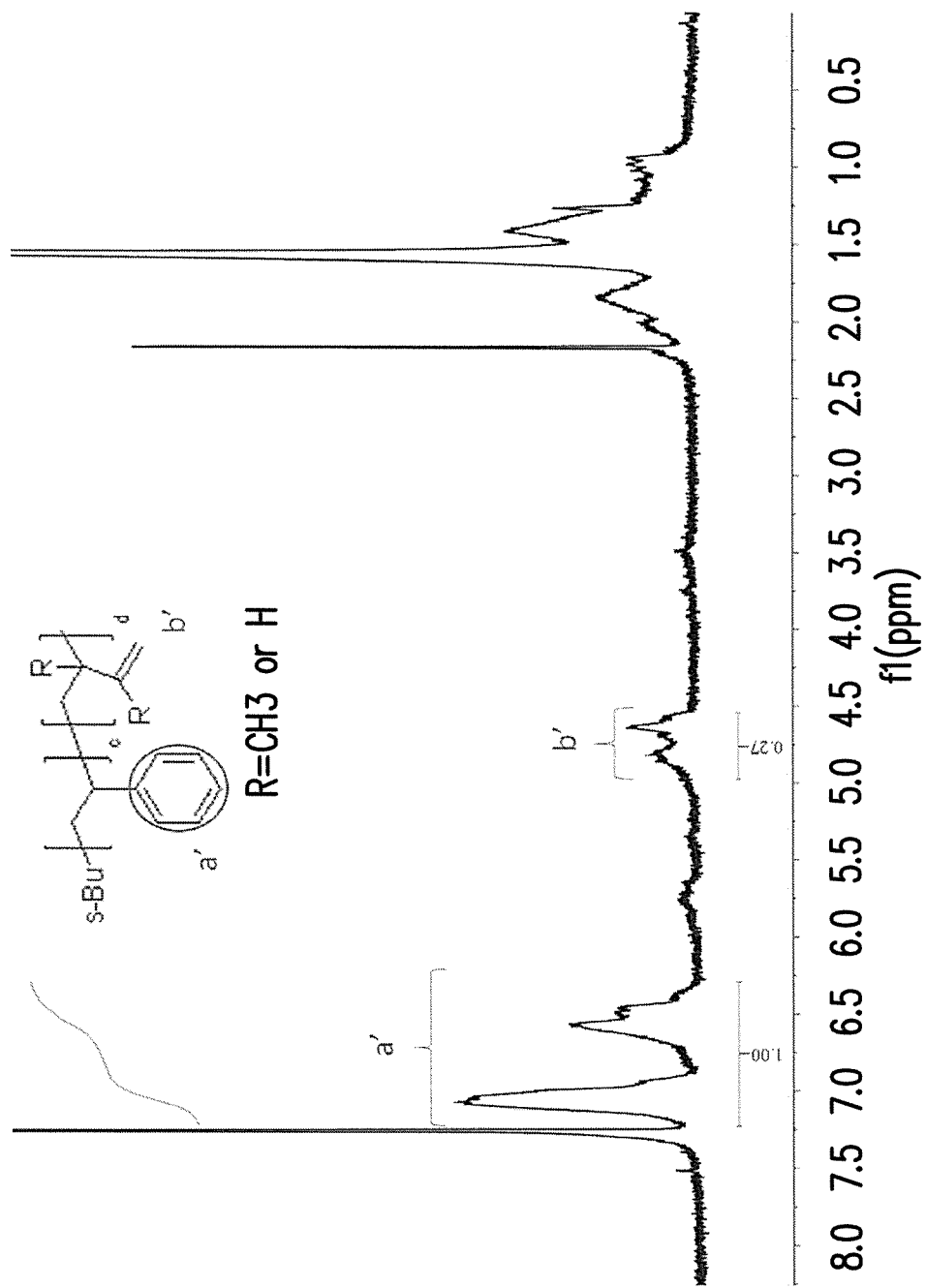
FIG. 5 shows 1H-NMR spectrum of example 2.

The PS standard product was compared by using GPC, and it was observed that the molecular weights of the two segments were respectively Mw 50,000 and 20,000 as shown in FIG. 4 and Table 2 below, wherein c and d are estimated to be about 480 and 294 respectively, and a nuclear magnetic resonance (1H-NMR) apparatus also confirmed the proportion of the two segments as shown in FIG. 5.

TABLE 2

|  | Mn | Mw | PDI |
|---|---|---|---|
| PS | 43716 | 50349 | 1.15 |
| SI 52 | 53646 | 71762 | 1.29 |

Then, a plasticizer DBP in a different amount was added to facilitate forming of film, and then measurement of lithium ionic conductivity was performed on the dry film, and the results are shown in Table 3 below.

TABLE 3

| | Dry film | |
|---|---|---|
| DBP content (wt %) | Thickness (μm) | σ (×10$^{-5}$ S/cm) |
|---|---|---|
| 0 | 50 | 2.8 |
| 5 | 101 | 4.8 |
| 10 | 95 | 4.3 |
| 15 | 101 | 4.0 |
| 20 | 132 | 4.2 |

It can be known from Table 3 that, for the polyelectrolyte of example 2, at room temperature and without any plasticizer or electrolyte solution, the ionic conductivity of $2.8 \times 10^{-5}$ S/cm can be achieved. With an addition of 5 wt % to 20 wt % of DBP, the ionic conductivity of the dry film is increased to $4.0 \times 10^{-5}$ S/cm or greater.

Figure 6:
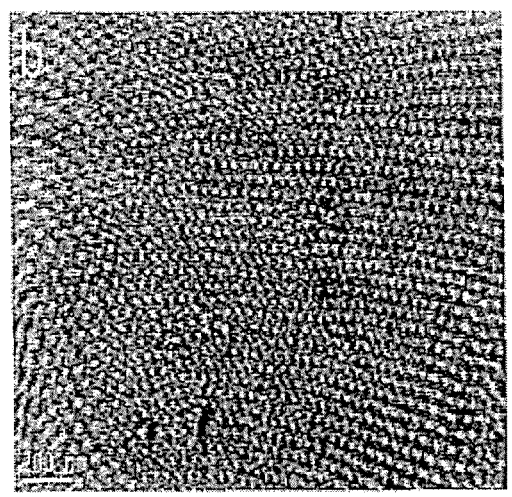
FIG. 6 is a cross-sectional TEM image of the polyelectrolyte without any plasticizer or electrolyte solution in example 2.

Moreover, testing was performed on the polyelectrolyte without a plasticizer to obtain an impregnated-only electrolyte (1M LiClO$_4$ in EC/PC), wherein the conductivity is increased to $23 \times 10^{-5}$ S/cm, and the impregnation ratio is 22 wt %. FIG. 6 shows a cross-sectional TEM image of a polyelectrolyte without a plasticizer and an electrolyte, and it can be observed that the polyelectrolyte of example 6 undergoes microphase separation to form a cylindrical structure.

EXAMPLE 3

According to the following synthesis process, 100 μl of sec-butyllithium (1.3M in cyclohexane) and 1.39 ml of p-tert-butoxystyrene monomer are added into THF solvent at −78° C., and then the mixture is stirred for 3 days. At the same temperature, 3.82 ml of isoprene monomer is added. The temperature is then risen to −30° C. After 3 days, anhydrous methanol is used to stop the reaction. In the meantime, a copolymer of poly(p-hydroxy styrene) and poly(1,2 or 3,4-isoprene) is precipitated.

2 g of foregoing copolymer is dissolved in THF, and 50 ml of 9-borabicyclo(3.3.1)nonane (9-BBN) [0.5M in THF] is added at −15° C. The mixture is heated to 55° C. and stands for 2 days, and then the temperature is cooled down to −25° C. 1 ml of methanol is added to the mixture and then stirred for 30 minutes. 0.5 g of 6N NaOH and 5 ml of 30% H$_2$O$_2$ aqueous solution are added in the mixture. After 2 hours, the temperature is risen to 55° C. for 1 hour. After phase separation, the upper level solution is added in to 0.25M NaOH aqueous solution and then precipitated to obtain a copolymer in which the double bonds of isoprene are hydrolyzed into hydroxyl groups.

2 mmol of the hydrolyzed copolymer is dissolved in THF, and then 2.5 mmol of NaOH is added and stirred for 12 hours. 2.8 mmol of liquid crystal (LC)-containing reactant and 3 mmol of TBAB (tetrabutylammonium bromide) are added, and the temperature is risen to 60° C. After 4 days, the product is cleaned by large amounts of pure water. Afterward, the product is cleaned by methanol, so as to obtain a LC polymer.

12 g of the LC polymer is solved in 1,4-dioxane, and 9.82 ml of 85 wt % phosphoric acid solution is added at room temperature for 12 hours. The polymer is precipitated in n-hexane followed by water rinse again and again, so as to obtain a de-protection LC polymer.

10.8 g of the de-protection LC polymer is dissolved in THF. 3.6 g of KH is added in the mixture to react for 1 hour. Next, 5.35 g of 1,3-propanesultone is added in the mixture and then the temperature is risen to 60° C. After 24 hours, the product is cleaned by methanol, and excess TBAOH (tetrabutylammonium hydroxide) is added. After cleaning by 1.5M sulfuric acid solution, the resulting polyelectrolyte is obtained (R is $CH_3$ or H).

Figure 7:
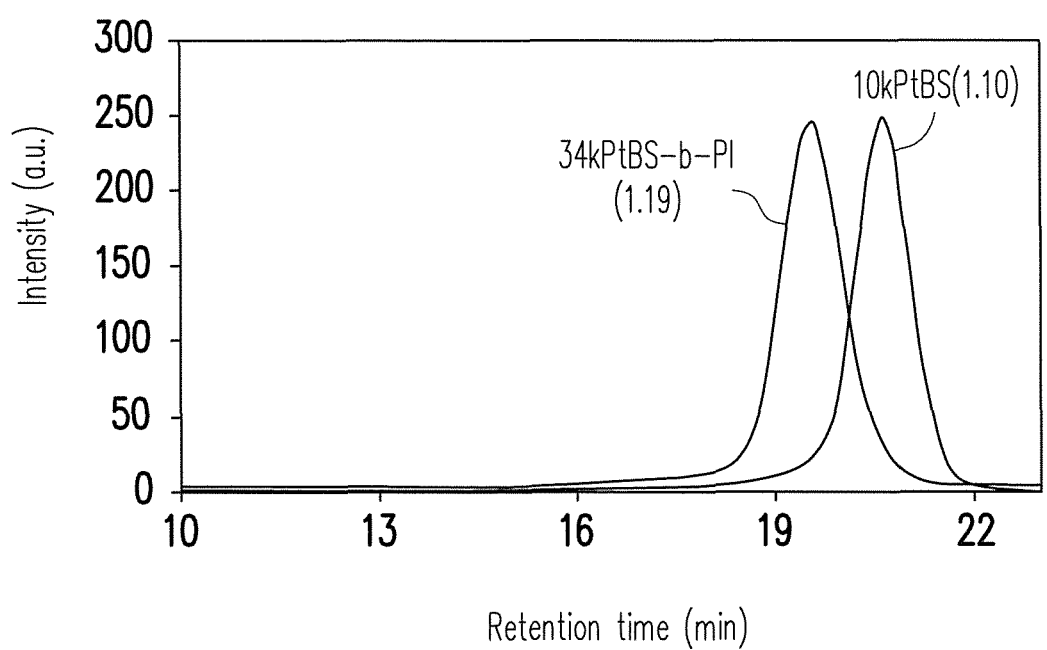
FIG. 7 shows a GPC chromatograph of example 3 without grafting LC.
Figure 8:
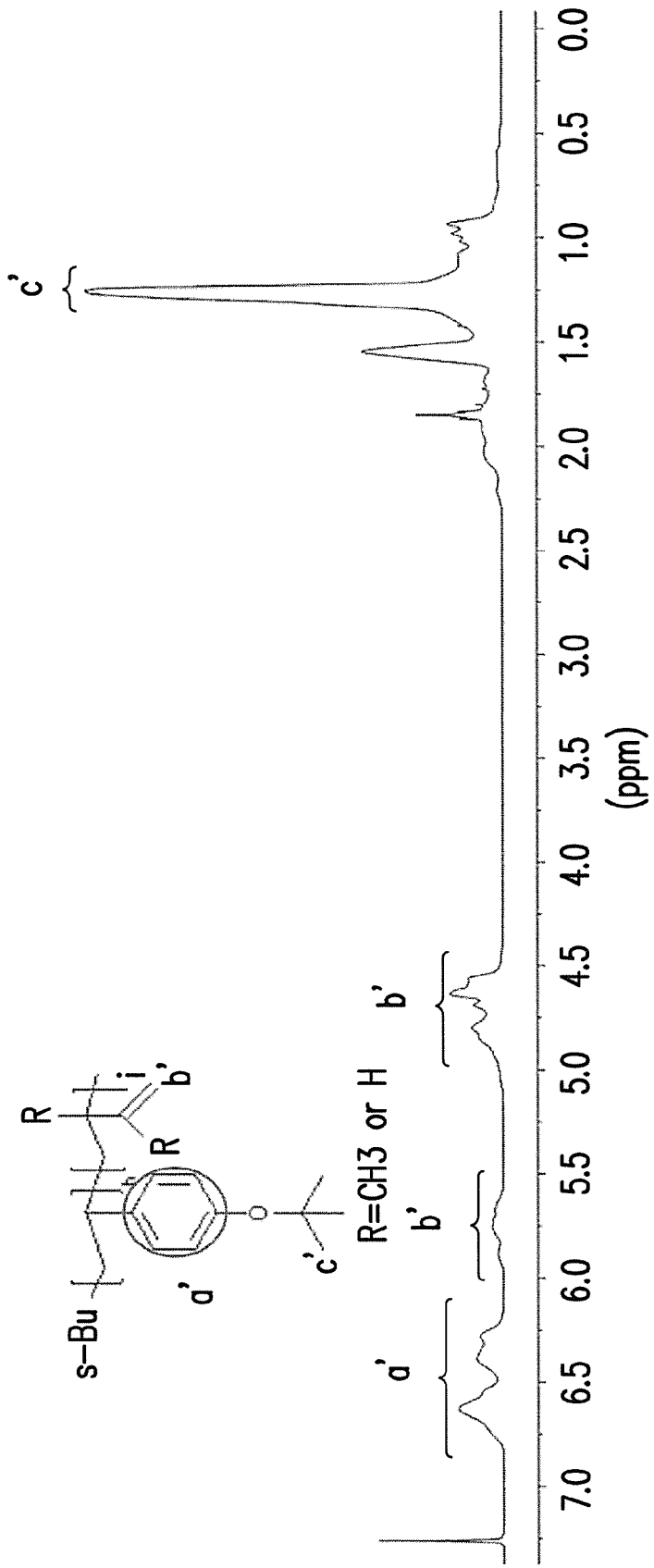
FIG. 8 shows 1H-NMR spectrum of example 3 without grafting LC.
Figure 9:
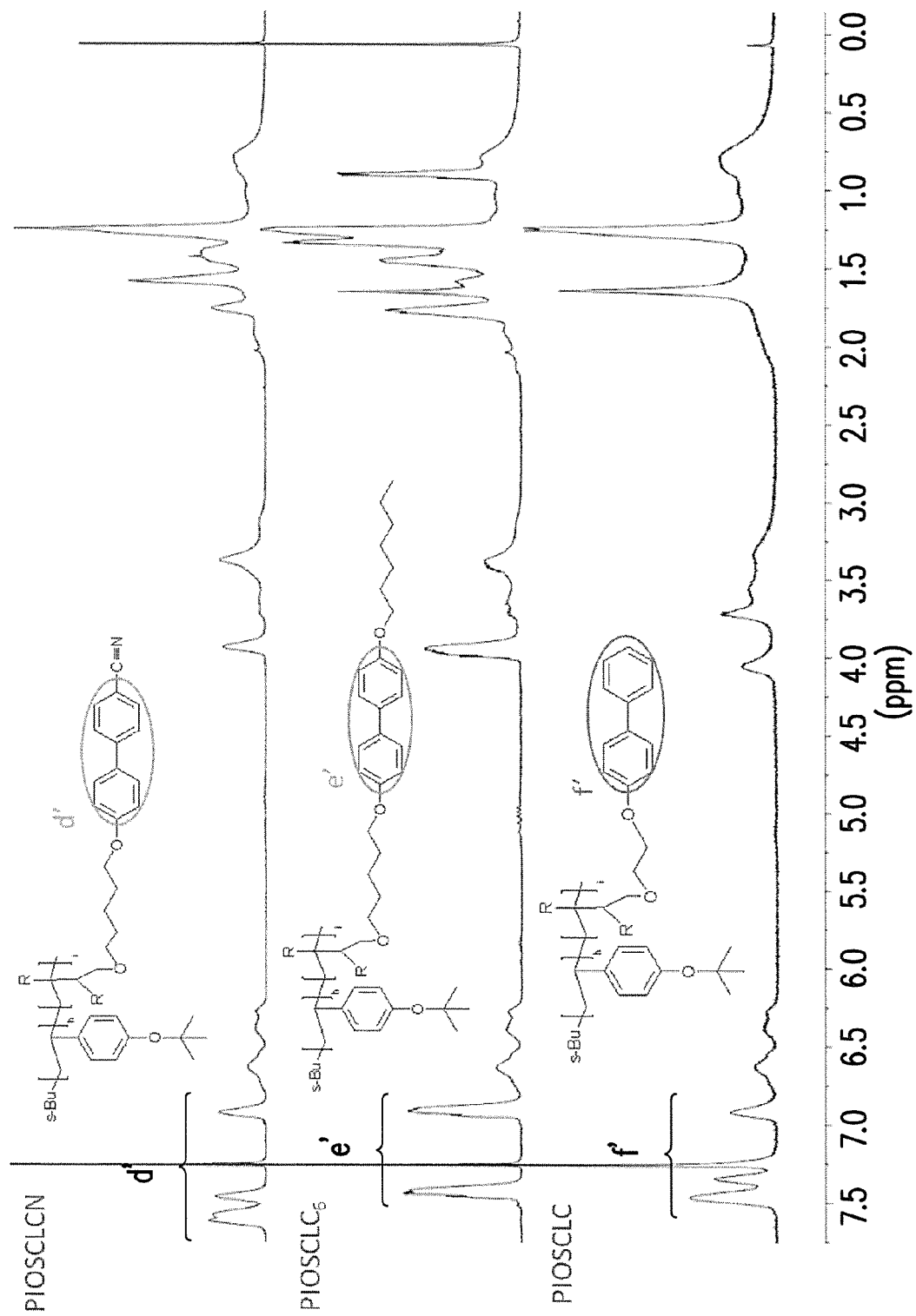
FIG. 9 shows 1H-NMR spectrum of example 3.
Figure 10:
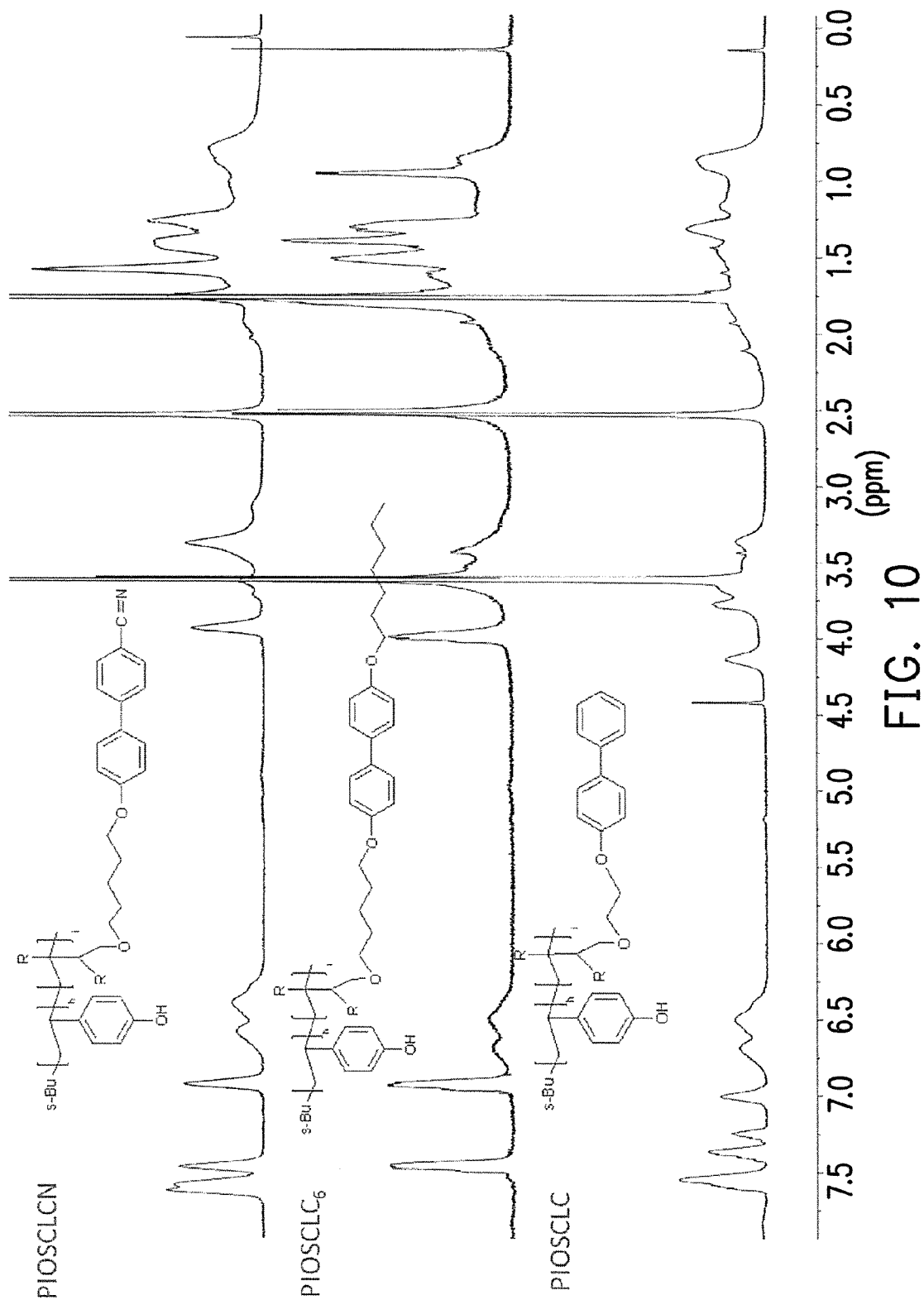
FIG. 10 shows 1H-NMR spectrum of example 3.

The PS standard product was compared by using GPC, and it was observed that the molecular weights of the two segments were respectively Mn 10,000 and 20,000 as shown in FIG. 7 and Table 4 below, wherein h and i are estimated to be about 57 and 295 respectively. FIG. 7 shows PtBS and PtBS-b-PI GPC chromatograph, and a nuclear magnetic resonance (1H-NMR) apparatus also confirmed the proportion of the two segments as shown in FIG. 8. FIGS. 9 and 10 are 1H-NMR spectrums of PtBS-b-PIOBP, PtBS-b-PI-OLCN and PtBS-b-PIOLC$_6$ and confirmed the proportion of the two segments.

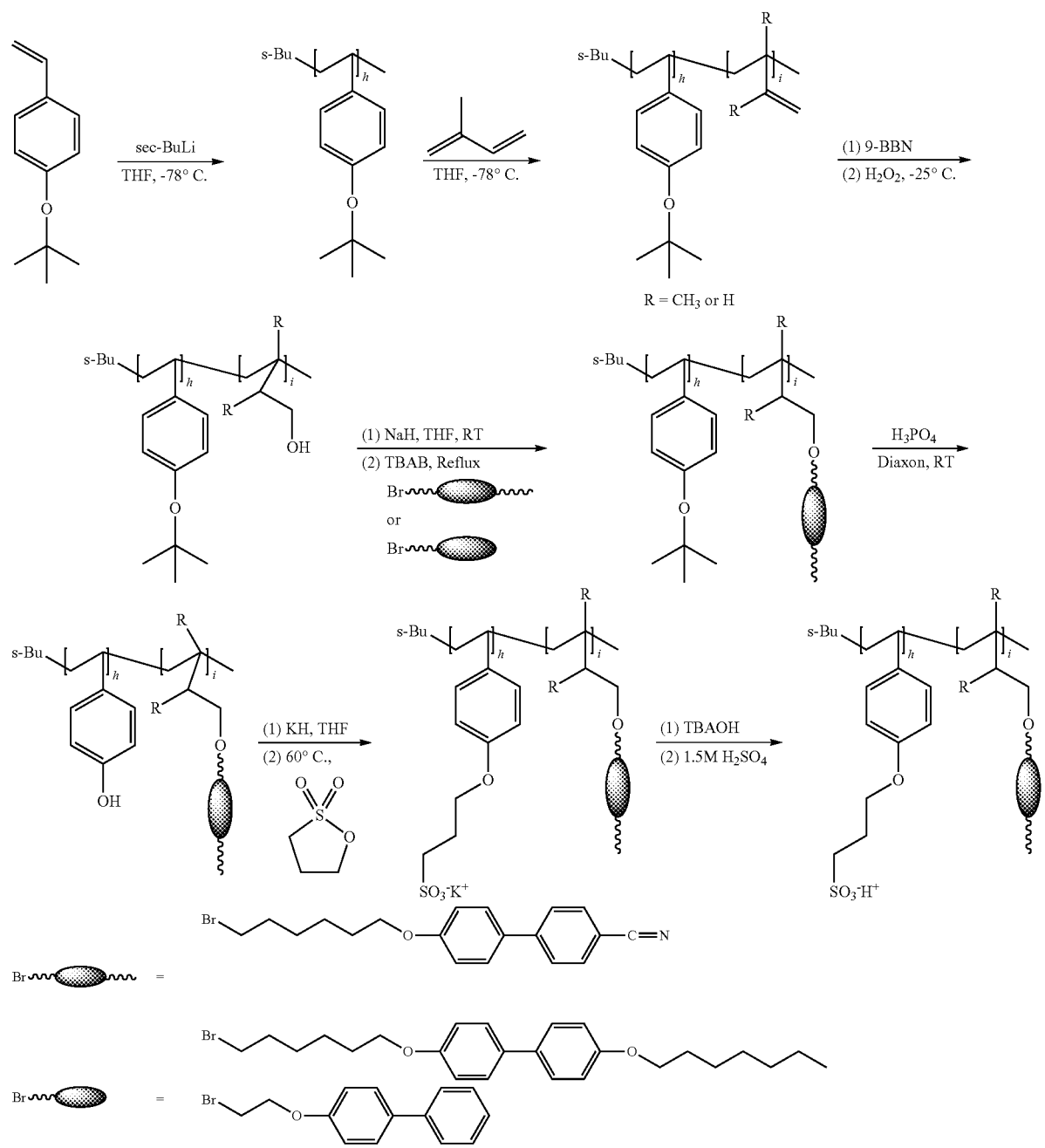

TABLE 4

| Sample code | Mn (g/mol) | PDI | Correctional Mn (g/mol) | Deg. Of LC grafting (%) |
|---|---|---|---|---|
| PtBS | 10400 | 1.10 | — | — |
| PtBS-b-PI | 34221 | 1.19 | 20107 | — |
| PtBS-b-PIOBP | 52100 | 1.21 | 31000 | 79 |
| PtBS-b-PIOLCN | 73500 | 1.25 | 32000 | 69 |
| PtBS-b-PIOLC$_6$ | 81000 | 1.26 | 33000 | 75 |

Measurement of proton conductivity was performed on the wet film of the polyelectrolyte washed with acid, and the results are shown in Table 5 below.

TABLE 5

| Terminal functional group | Wet film | |
|---|---|---|
| | Thickness (μm) | σ (×10$^{-2}$ S/cm) |
| PIOSCLC | 213 | 1.44 |
| PIOSCLCN | 219 | 2.33 |
| PIOSCLC$_6$ | 223 | 1.01 |

Figure 11:
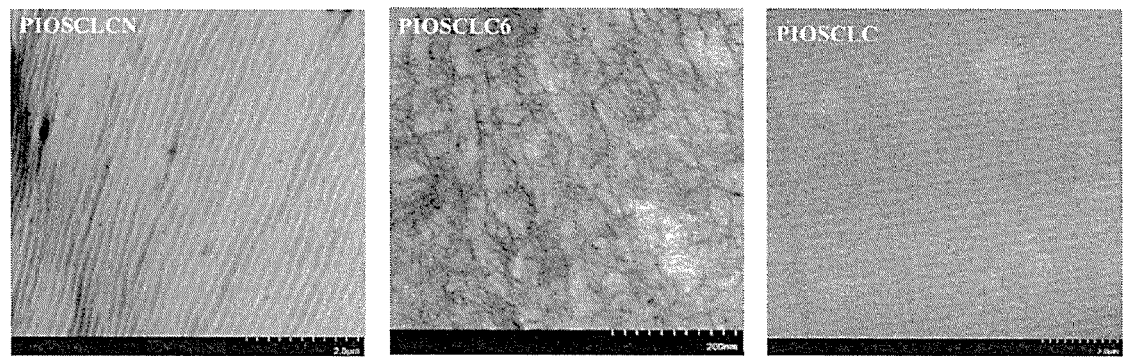
FIG. 11 is a cross-sectional TEM image of the polyelectrolyte with end-function-groups in example 3, wherein the end-function-groups are PIOSCLCN, $PIOSCLC_6$ and PIOSCLC respectively.

It can be known from Table 5 that, the proton conductivity of the polyelectrolyte of example 3 is $1.01 \times 10^{-2}$ S/cm to $2.33 \times 10^{-2}$ S/cm. FIG. 11 is a cross-sectional TEM image of a polyelectrolyte for which a terminal functional group are PIOSCLCN, PIOSCLC$_6$, and PIOSCLC respectively, and it can be observed that the polymer undergoes microphase separation to form a layered structure or an irregular structure.

EXAMPLE 4

According to the following synthesis process, 347.9 μl of sec-butyllithium (1.3M in cyclohexane) and 20 ml of styrene monomer are added into toluene solvent at room temperature, and then the mixture is stirred for 15 minutes. At the same temperature, 6.65 ml of isoprene monomer is added. The color of the mixture solution changes from deep red to light yellow. After 12 hours, the temperature is cooled down to −78° C., and then 13.28 ml of isoprene monomer are added into THF solvent. When the color of the mixture solution become lighter, the temperature is raised to −30° C. After 4 days, anhydrous methanol is used to stop the reaction. In the meantime, a copolymer of polystyrene, poly(1,4-isoprene) and poly(1,2 or 3,4-isoprene) is precipitated.

4 g of foregoing copolymer is dissolved in THF, and 100 ml of 9-borabicyclo(3.3.1)nonane (9-BBN) [0.5M in THF] is added at −15° C. The mixture is heated to 55° C. and stands for 2 days, and then the temperature is cooled down to −25° C. 1 ml of methanol is added to the mixture and then stirred for 30 minutes. 2 g of 6N NaOH and 11 ml of 30% H$_2$O$_2$ aqueous solution are added in the mixture. After 2 hours, the temperature is risen to 55° C. for 1 hour. After phase separation, the upper level solution is added in to 0.25M NaOH aqueous solution and then precipitated to obtain a copolymer in which the double bonds of isoprene are hydrolyzed into hydroxyl groups.

1 g of the hydrolyzed copolymer is solved in THF. After heating to 60° C., 0.66 g of KH is added the mixture to react for 2 hours. Next, 0.44 ml of 1,3-propanesultone is added in the mixture. After 8 hours, the product is cleaned by methanol, and excess TBAOH (tetrabutylammonium hydroxide) and 1.5M sulfuric acid solution are added respectively. After cleaning by 1M LiOH aqueous solution, the resulting polyelectrolyte is obtained (R is CH$_3$ or H).

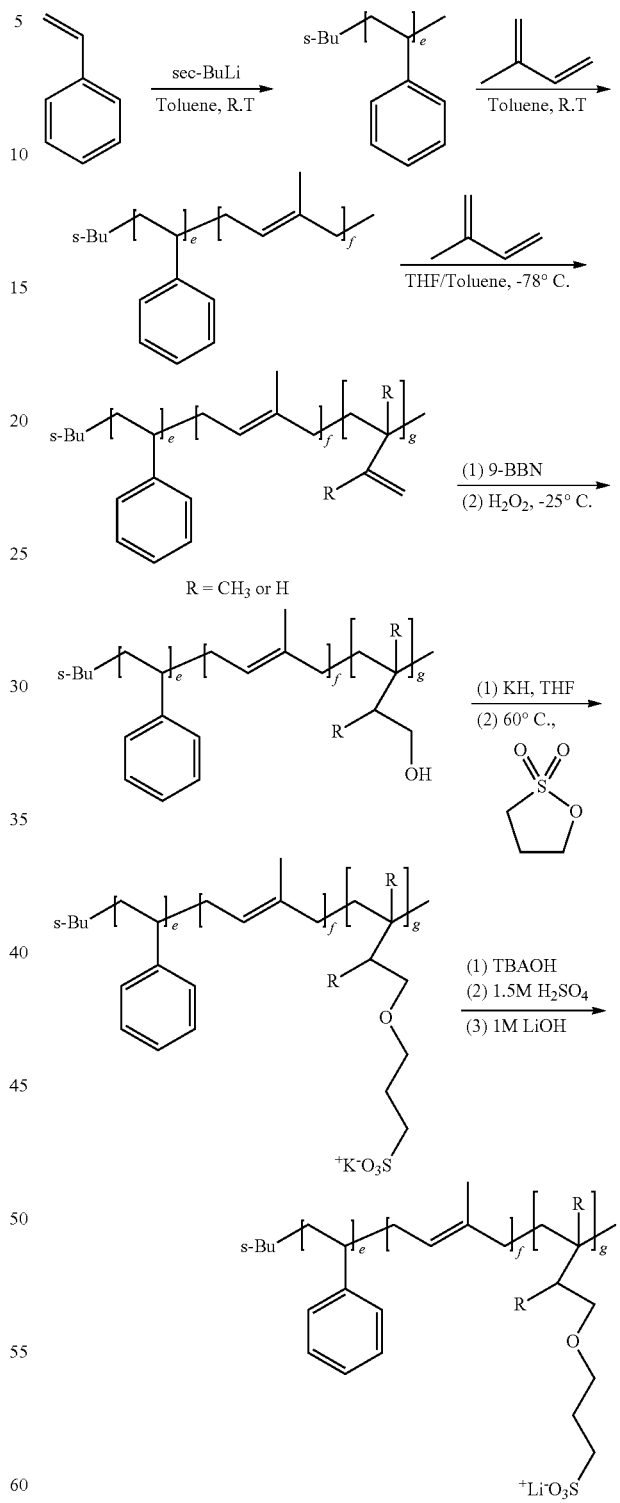

Figure 12:
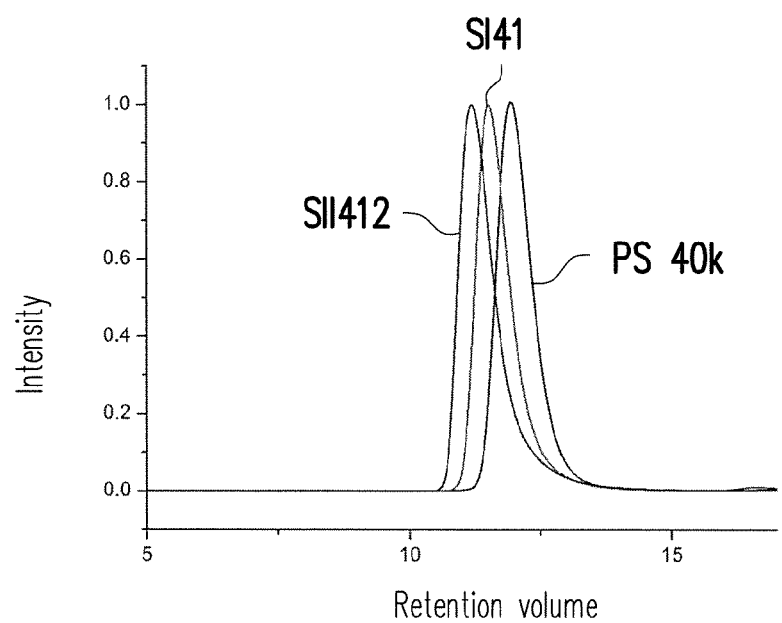
FIG. 12 is a GPC chromatograph of example 4.

The PS standard product was compared by using GPC, and it was observed that the molecular weights of the three segments were respectively Mw 40,000, 10,000 and 20,000 as shown in FIG. 12 and Table 6 below, wherein e, f and g are estimated to be about 236, 148 and 294 respectively.

TABLE 6

|  | Mn | Mw | PDI |
|---|---|---|---|
| PS | 37600 | 40819 | 1.09 |
| SII 412 | 75639 | 90070 | 1.19 |

Figure 13:
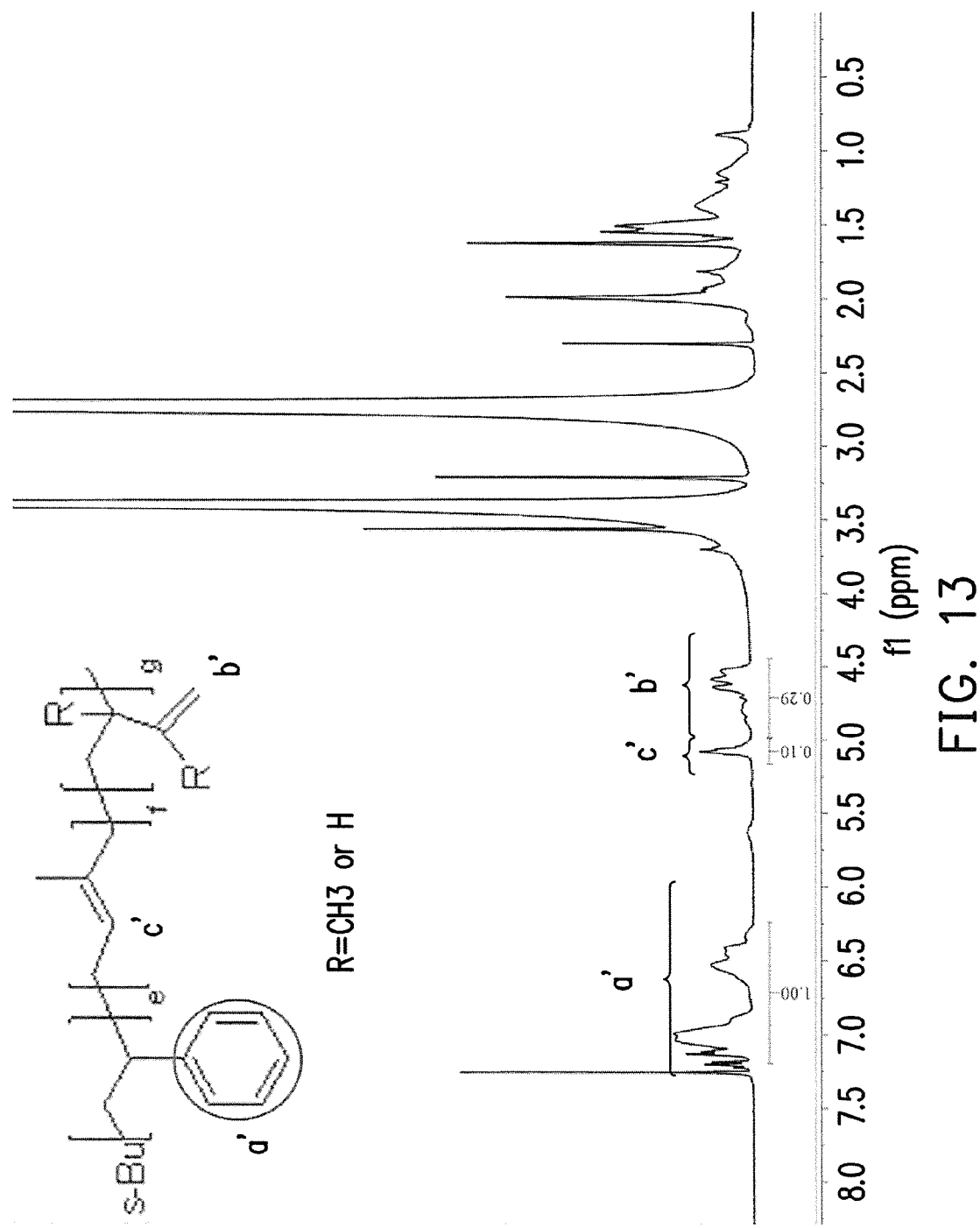
FIG. 13 shows 1H-NMR spectrum of example 4.

A nuclear magnetic resonance (1H-NMR) apparatus also confirmed the proportion of the three segments as shown in FIG. 13.

Then, a plasticizer DBP in a different amount was added. Measurement was respectively performed on the dry film and the wet film soaked in an electrolyte solution (1M $LiClO_4$ in EC/PC), and the results are shown in Table 7 below.

TABLE 7

| DBP content (wt %) | Dry film | | Wet film | |
|---|---|---|---|---|
| | Thickness (μm) | σ (×$10^{-5}$ S/cm) | σ (×$10^{-5}$ S/cm) | Impregnation ratio (wt %) |
| 0 | 50 | 4.8 | 32 | 10 |
| 10 | 37 | 1.2 | 4.5 | 5.2 |
| 20 | 98 | 4.8 | 30 | N/A |

Figure 14:
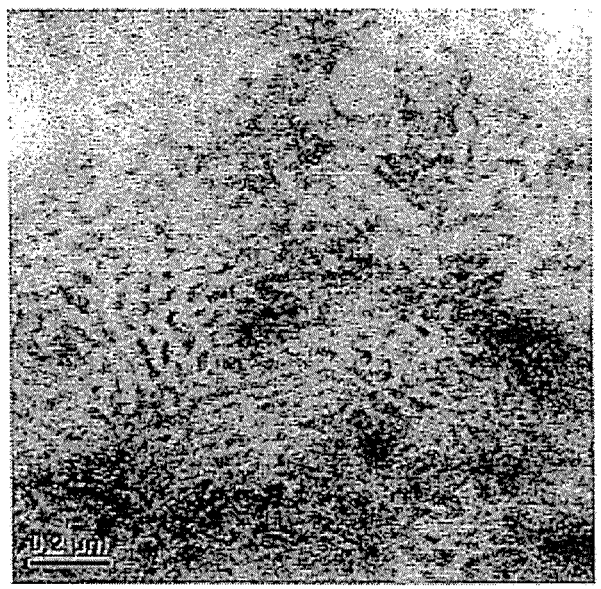
FIG. 14 is a cross-sectional TEM image of the polyelectrolyte without any plasticizer or electrolyte solution in example 4.

It can be known from Table 7 that, at room temperature and without any plasticizer or electrolyte, the ionic conductivity is $4.8 \times 10^{-5}$ S/cm; without an additive, the conductivity of the impregnated-only electrolyte is increased to $3.2 \times 10^{-4}$ S/cm, and impregnation ratio is 10 wt %. With an addition of 10 wt % to 20 wt % of DPB, the ionic conductivity of the dry film is $1.2 \times 10^{-5}$ to $4.8 \times 10^{-5}$ S/cm. When a polyelectrolyte containing 20 wt % of DPB was impregnated into an electrolyte, the ionic conductivity is increased to $3 \times 10^{-4}$ S/cm. FIG. 14 shows a cross-sectional TEM image of the polyelectrolyte of example 4 without a plasticizer and an electrolyte, and shows that the polymer undergoes microphase separation to form a cylindrical structure.

EXAMPLE 5

The polyelectrolytes in different proportion of molecular weight are prepared by the same way of example 4 with different feed ratios. The weight-average molecular weights (Mw) of SII-411 segments are 40000, 10000 and 10000 respectively; the Mw of SII-412 segments are 40000, 10000 and 20000 respectively; the Mw of SII-422 segments are 40000, 20000 and 20000 respectively; the Mw of SII-522 are 50000, 20000 and 20000 respectively. The conductivity thereof is shown in Table 8 below.

TABLE 8

| | Dry film | | Wet film | |
|---|---|---|---|---|
| | Thickness (μm) | σ (×$10^{-5}$ S cm$^{-1}$) | σ (×$10^{-5}$ S cm$^{-1}$) | Impregnation ratio (wt %) |
| SII-411 | 87 | 5.3 | 9.8 | 8.7 |
| SII-412 | 67 | 9.7 | 10.3 | 7.6 |
| SII-422 | 87 | 12.0 | 10.2 | 15.0 |
| SII-522 | 59 | 8.1 | 11.6 | 20.0 |

It can be known from Table 8 that, at room temperature and without any plasticizer or electrolyte, the ionic conductivity is $5.3 \times 10^{-5}$ S/cm to $12.0 \times 10^{-5}$ S/cm; without an additive, the conductivity of the impregnated-only electrolyte is increased to $9.8 \times 10^{-4}$ S/cm to $11.6 \times 10^{-5}$ S/cm, and the impregnation ratio is 7.6 wt % to 20 wt %.

Based on the above, the polyelectrolyte provided by the disclosure can reduce or completely omit an electrolyte solution that is readily volatilized and flammable in an energy storage device. Moreover, at room temperature and without any electrolyte, an ionic conductivity of about $10^{-5}$ S/cm is still obtained, and in the case of impregnating a small amount of electrolyte, an ionic conductivity of about $10^{-4}$ S/cm can be obtained. Such polyelectrolyte can be applied in any electrochemical energy storage device, and can effectively eliminate or reduce the use of an electrolyte, thus significantly increasing the characteristics of the electrochemical energy storage device.

Although the disclosure has been described with reference to the above embodiments, it will be apparent to one of the ordinary skill in the art that modifications to the described embodiments may be made without departing from the spirit of the disclosure. Accordingly, the scope of the disclosure is defined by the attached claims not by the above detailed descriptions.

What is claimed is:

1. A polyelectrolyte, comprising a first segment and a second segment, wherein
a structure of the first segment is formula (2):

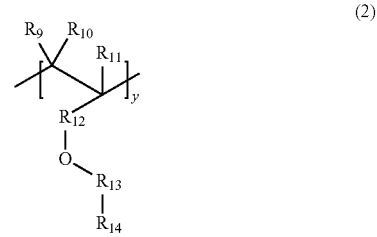

in formula (2), $R_9$ to $R_{11}$ are each independently H, F, or

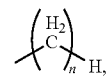

$R_{12}$ is

$R_{13}$ is

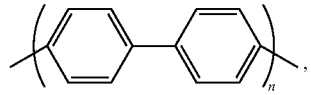

$R_{14}$ is H,

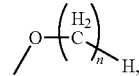

or —CN, n=1 to 10, y=1 to 1000;

a structure of the second segment is at least one of formula (3) and formula (4):

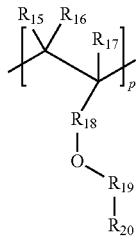
(3)

in formula (3), $R_{15}$ to $R_{17}$ are each independently H, F, or

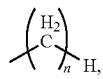

$R_{18}$ to $R_{19}$ are each independently

$R_{20}$ is $SO_3^-M^+$, $PO_4^-M^+$, or $COO^-M^+$, n=1 to 10, $M^+$ is $H^+$, $Li^+$, $Na^+$, or $K^+$, p=1 to 500;

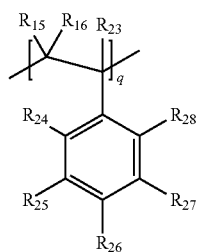
(4)

in formula (4), $R_{21}$ to $R_{23}$ are each independently H, F, or

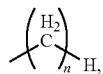

$R_{24}$ to $R_{28}$ are each independently H, F,

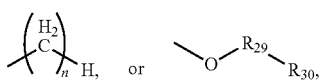

and at least one of $R_{24}$ to $R_{28}$ is

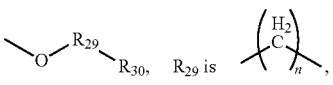, $R_{29}$ is $R_{30}$ is $SO_3^-M^+$, $PO_4^-M^+$, or $COO^-M^+$, n=1 to 10, $M^+$ is $H^+$, $Li^+$, $Na^+$, or $K^+$, q=1 to 500.

2. The polyelectrolyte of claim 1, wherein the first segment and the second segment are repeated, or arranged in random.

3. The polyelectrolyte of claim 1, wherein a weight average molecular weight of the first segment is between 10,000 and 90,000.

4. The polyelectrolyte of claim 1, wherein a weight average molecular weight of the second segment is between 10,000 and 30,000.

5. The polyelectrolyte of claim 1, wherein a molecular repeating unit y of the first segment is 300 to 900.

6. The polyelectrolyte of claim 1, wherein a molecular repeating unit p or q of the second segment is 50 to 200.

7. The polyelectrolyte of claim 1, wherein an ionic conductivity of the polyelectrolyte is greater than $10^{-5}$ S/cm at room temperature and without any solvent or electrolyte.

8. A polyelectrolyte, comprising a first segment, a second segment, and a third segment, and the third segment is between the first segment and the second segment, wherein a structure of the first segment is formula (2):

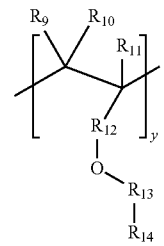
(2)

in formula (2), $R_9$ to $R_{11}$ are each independently H, F, or

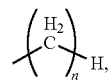

$R_{12}$ is

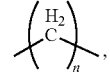

$R_{13}$ is

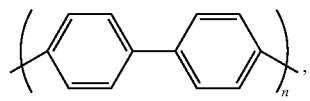

$R_{14}$ is H,

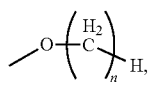

or —CN, n=1 to 10, y=1 to 1000;

a structure of the second segment is at least one of formula (3) and formula (4):

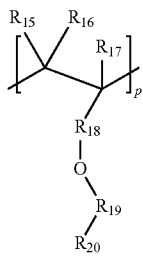 (3)

in formula (3), $R_{15}$ to $R_{17}$ are each independently H, F, or

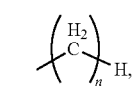

$R_{18}$ to $R_{19}$ are each independently

$R_{20}$ is $SO_3^-M^+$, $PO_4^-M^+$, or $COO^-M^+$, n=1 to 10, $M^+$ is $H^+$, $Li^+$, $Na^+$, or $K^+$, p=1 to 500;

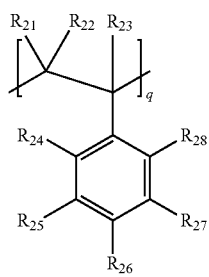 (4)

in formula (4), $R_{21}$ to $R_{23}$ are each independently H, F, or

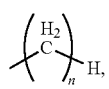

$R_{24}$ to $R_{28}$ are each independently H, F,

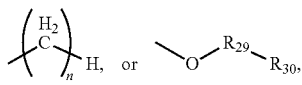

and at least one of $R_{24}$ to $R_{28}$ is

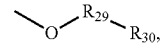

$R_{29}$ is

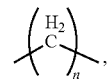

$R_{30}$ is $SO_3^-M^+$, $PO_4^-M^+$, or $COO^-M^+$, n=1 to 10, $M^+$ is $H^+$, $Li^+$, $Na^+$, or $K^+$, q=1 to 500;

a structure of the third segment is formula (5):

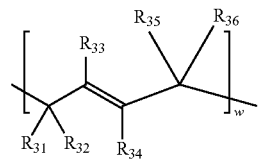 (5)

in formula (5), $R_{31}$ to $R_{36}$ are each independently H, F, or

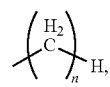

n=1 to 10, w=1 to 500.

9. The polyelectrolyte of claim 8, wherein the first segment, the second segment, and the third segment are repeated, or arranged in random.

10. The polyelectrolyte of claim 8, wherein a weight average molecular weight of the first segment is between 10,000 and 90,000.

11. The polyelectrolyte of claim 8, wherein a weight average molecular weight of the second segment is between 10,000 and 30,000.

12. The polyelectrolyte of claim 8, wherein a weight average molecular weight of the third segment is between 10,000 and 20,000.

13. The polyelectrolyte of claim 8, wherein a molecular repeating unit y of the first segment is 300 to 900.

14. The polyelectrolyte of claim 8, wherein a molecular repeating unit p or q of the second segment is 50 to 200.

15. The polyelectrolyte of claim 8, wherein a molecular repeating unit w of the third segment is 100 to 400.

16. The polyelectrolyte of claim 8, wherein an ionic conductivity of the polyelectrolyte is greater than $10^{-5}$ S/cm at room temperature and without any solvent or electrolyte.

17. An energy storage device, comprising the polyelectrolyte of claim 1, wherein the polyelectrolyte is applied within the energy storage device via mixing, coating, covering, or adding.

18. The energy storage device of claim 17, wherein the energy storage device comprises a lithium ion primary battery, a lithium ion secondary battery, a capacitor, a supercapacitor, a fuel cell, a metal-sulfur battery, or a metal-air battery.

19. The energy storage device of claim 17, further comprising a plasticizer added in the polyelectrolyte.

20. The energy storage device of claim 19, wherein the plasticizer comprises bis(2-ethylhexyl)phthalate (BEHP), dibutyl phthalate (DBP), or diisobutyl phthalate (DIBP).

21. The energy storage device of claim 17, further comprising a liquid electrolyte added in the polyelectrolyte.

22. The energy storage device of claim 17, further comprising a solvent added in the polyelectrolyte, wherein the solvent comprises propylene carbonate (PC), ethylene carbonate (EC), diethyl carbonate (DEC), dimethyl carbonate (DEC), or ethyl methyl carbonate (EMC).

23. The energy storage device of claim 21, wherein the liquid electrolyte comprises a solvent and a lithium salt dissolved in the solvent, wherein the solvent comprises propylene carbonate (PC), ethylene carbonate (EC), diethyl carbonate (DEC), dimethyl carbonate (DEC), or ethyl methyl carbonate (EMC).

24. The energy storage device of claim 23, wherein the lithium salt comprises $LiPF_6$, $LiBF_4$, $LiClO_4$, or LiTFSI.

25. An energy storage device, comprising the polyelectrolyte of claim 8, wherein the polyelectrolyte is applied within the energy storage device via mixing, coating, covering, or adding.

26. The energy storage device of claim 25, wherein the energy storage device comprises a lithium ion primary battery, a lithium ion secondary battery, a capacitor, a supercapacitor, a fuel cell, a metal-sulfur battery, or a metal-air battery.

27. The energy storage device of claim 25, further comprising a plasticizer added in the polyelectrolyte.

28. The energy storage device of claim 27, wherein the plasticizer comprises bis(2-ethylhexyl)phthalate (BEHP), dibutyl phthalate (DBP), or diisobutyl phthalate (DIBP).

29. The energy storage device of claim 25, further comprising a liquid electrolyte added in the polyelectrolyte.

30. The energy storage device of claim 25, further comprising a solvent added in the polyelectrolyte, wherein the solvent comprises propylene carbonate (PC), ethylene carbonate (EC), diethyl carbonate (DEC), dimethyl carbonate (DEC), or ethyl methyl carbonate (EMC).

31. The energy storage device of claim 29, wherein the liquid electrolyte comprises a solvent and a lithium salt dissolved in the solvent, wherein the solvent comprises propylene carbonate (PC), ethylene carbonate (EC), diethyl carbonate (DEC), dimethyl carbonate (DEC), or ethyl methyl carbonate (EMC).

32. The energy storage device of claim 31, wherein the lithium salt comprises $LiPF_6$, $LiBF_4$, $LiClO_4$, or LiTFSI.

\* \* \* \* \*